United States Patent
Vialén et al.

(10) Patent No.: US 6,826,406 B1
(45) Date of Patent: Nov. 30, 2004

(54) METHOD FOR RECONFIGURING A CELLULAR RADIO NETWORK CONNECTION

(75) Inventors: Jukka Vialén, Espoo (FI); Juhana Britschgi, Kirkkonummi (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/627,526

(22) Filed: Jul. 28, 2000

Related U.S. Application Data (63) Continuation of application No. PCT/FI98/00674, filed on Aug. 31, 1998.

(30) Foreign Application Priority Data

Jan. 29, 1998 (FI) .................................................. 980208

(51) Int. Cl.⁷ ............................................... H04Q 7/20
(52) U.S. Cl. ...................... 455/450; 455/446; 455/452.2
(58) Field of Search ................................ 455/450, 456, 455/62, 67.1, 403, 422, 423, 424, 425, 560, 517, 519, 511

(56) References Cited

U.S. PATENT DOCUMENTS 6,031,832 A * 2/2000 Turina ........................ 370/348
6,374,112 B1 * 4/2002 Widegren et al. ........... 455/452

FOREIGN PATENT DOCUMENTS

| WO | WO 95/35002 | * 12/1995 | ............ H04Q/7/24 |
|----|-------------|-----------|----------------------|
| WO | WO 97/12490 | * 4/1997  | ............ H04Q/7/24 |
| WO | WO 97/42780 | 11/1997   |                      |
| WO | WO 98/30042 | * 7/1998  | ............ H04Q/7/00 |
| WO | WO 98/36589 | 8/1998    |                      |
| WO | WO 99/39528 | * 8/1999  | ............ H04Q/7/24 |

* cited by examiner

Primary Examiner—Tilahun Gesesse
(74) Attorney, Agent, or Firm—Squire, Sanders & Dempsey L.L.P.

(57) ABSTRACT

The invention relates to a method for reconfiguring a cellular radio network connection comprising a network part having a connection to a mobile station through at least one radio bearer. According to the invention, a first party of the connection, i.e. the network part or the mobile station, sends a second party of the connection, i.e. the mobile station or the network part, a reconfiguration request message concerning at least one radio bearer. The second party of the connection possibly replies to this by sending the first party of the connection a reply message to the radio bearer reconfiguration request message. The radio bearer reconfiguration request message comprises at least one radio bearer identifier and, for example, bearer quality of service of the radio bearer in question. The possible reply message comprises at least one radio bearer identifier and possibly also bearer quality of service assigned to the radio bearer in question, or a cause for a failed reconfiguration of the radio bearer in question.

21 Claims, 5 Drawing Sheets

METHOD FOR RECONFIGURING A CELLULAR RADIO NETWORK CONNECTION

This application is a continuation of PCT/FI98/00674 filed Aug. 31, 1998.

FIELD OF THE INVENTION

The invention relates to a method for reconfiguring a cellular radio network connection. The reconfiguration particularly concerns a radio bearer providing a connection between a network part and a mobile station.

BACKGROUND OF THE INVENTION

In the GSM system connection reconfiguration concerns the modifying of a call mode. The procedure is known as in-call modification. The term 'mode' means the operational status of a call; it can be for instance a standard speech mode, data mode, fax mode, an alternating speech/data mode or an alternating speech/fax mode. When a connection is reconfigured, its mode can thus be changed e.g. from a speech mode to a data mode. In case the channel used for the connection does not support the required characteristics, channel configuration can be changed. The solution known from the GSM system is not, however, applicable for use in UMTS (Universal Mobile Telephone System) described below. The reason for this is that in the UMTS a single connection can simultaneously use one or more radio bearers. The characteristics of the radio bearers may have to be modified upon establishment of or during a connection.

The term 'radio bearer' refers to a service provided by a network layer. Multimedia service typically uses a plural number of radio bearers simultaneously for providing a service. Video telephony, for example, may require four different radio bearers: transmission of speech and image both use separate radio bearers for uplink and downlink. A multimedia service, such as video telephony, can also be implemented by using only one radio bearer per transmission direction, thereby avoiding the problem of synchronization between radio bearers of the same transmission direction. Radio bearer parameters comprise most of the first and second layer operational parameters. A radio bearer user, however, does not know the parameters of lower layers. Therefore the radio bearer user is not aware of how the radio bearer provides its services, i.e. whether it uses a half of a TDMA time slot, one time slot or a plural number of them, or one or more CDMA spreading codes.

A radio bearer is defined by a set of parameters or attributes that concern the traffic or quality characteristics of a service provided. A radio bearer is not to be considered similar to a logical channel, which is a service provided by a data link layer.

BRIEF DESCRIPTION OF THE INVENTION

An object of the invention is therefore to provide a method and an equipment implementing the method in such a way that the above problems can be solved. This is achieved with the method described below, which is a method for reconfiguring a cellular radio network connection comprising a network part, the network part having a connection to a mobile station through at least one radio bearer. According to the method, a first party of the connection sends to a second party of the connection a radio bearer reconfiguration request message involving at least one radio bearer; the second party of the connection sends to the first party of the connection a reply message to the radio bearer reconfiguration request message.

The invention also relates to a cellular radio network comprising: a protocol software of a network layer of a network part, the software being arranged to have a connection to a mobile station through at least one radio bearer; a protocol software of a network layer of the mobile station, the software being arranged to have a connection to the network part through at least one radio bearer. The protocol software of the network layer of the network part is arranged to transmit to the protocol software of the network layer of the mobile station a radio bearer reconfiguration request message involving at least one radio bearer; the protocol software of the network layer of the mobile station is arranged to transmit to the protocol software of the network layer of the network part a reply message to the radio bearer reconfiguration request message.

The invention further relates to a cellular radio network comprising: a protocol software of a network layer of a network part, the software being arranged to have a connection to a mobile station through at least one radio bearer; a protocol software of a network layer of the mobile station, the software being arranged to have a connection to the network part by means of at least one radio bearer. The protocol software of the network layer of the mobile station is arranged to transmit to the protocol software of the network layer of the network part a radio bearer reconfiguration request message involving at least one radio bearer; the protocol software of the network layer of the network part is arranged to transmit to the protocol software of the network layer of the mobile station a reply message to the radio bearer reconfiguration request message.

The invention further relates to a method for reconfiguring a cellular radio network connection comprising a network part, the network part having a connection to a mobile station through at least one radio bearer. A first party of a connection transmits to a second party of the connection a radio bearer reconfiguration request message involving at least one radio bearer.

The preferred embodiments of the invention are disclosed in the dependent claims.

The invention is based on that either of the communicating parties can request, when needed, a radio bearer reconfiguration.

A method and system of the invention provide several advantages. The solution enables reconfiguration to be flexibly implemented in a system employing radio bearers. A plural number of radio bearers can be simultaneously reconfigured, the number of messages needed being thereby reduced, which in turn decreases the load on radio resources. When necessary, reconfiguration of radio bearers used for signalling can be carried out at connection set-up, thus avoiding a reallocation of signalling radio bearers that would perhaps otherwise be needed.

BRIEF DESCRIPTION OF THE DRAWINGS

In the following the invention will be described in greater detail in connection with preferred embodiments and with reference to the attached drawings, in which.

DETAILED DESCRIPTION OF THE INVENTION

Figure 1:
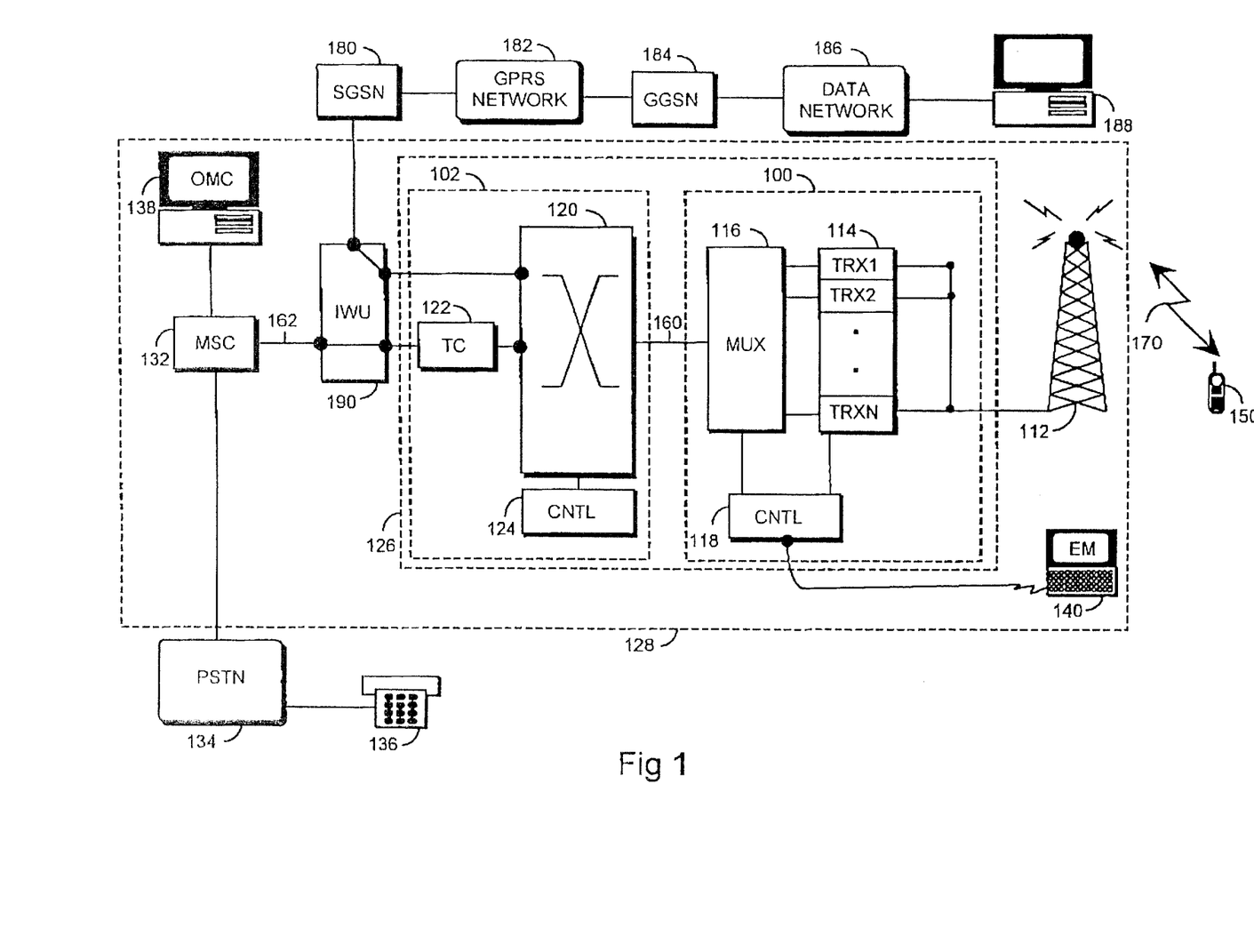
FIG. 1 illustrates an example of a cellular radio network structure.

With reference to FIG. 1, a typical cellular radio network structure of the invention will be described. FIG. 1 only comprises the blocks that are essential for the description of the invention, although it is apparent to a person skilled in the art that a common cellular radio network also comprises other functions and structures which need not be discussed in greater detail here. The examples describe a cellular radio network employing TDMA (Time Division Multiple Access), the invention not being, however, restricted to it. The invention can be applied to GSM-based cellular radio networks, in other words, to systems that are at least partially based on GSM specifications. One example is the UMTS (Universal Mobile Telephone System).

A cellular radio network typically comprises a fixed network infrastructure, i.e. a network part 128, and mobile stations 150, which may be fixedly mounted, vehicle mounted or hand-held portable terminals. The network part 128 comprises base stations 100. A plural number of base stations 100 are, in turn, controlled in a centralized manner by a base station controller 102 communicating with them. A base station 100 comprises transceivers 114. A base station 100 typically comprises 1–16 transceivers 114. In TDMA radio systems, for example, a transceiver 114 offers radio capacity to one TDMA frame, i.e. typically to eight time slots.

The base station 100 comprises a control unit 118 which controls the operation of the transceivers 114 and a multiplexer 116. The multiplexer 116 arranges traffic and control channels used by a plural number of transceivers 114 on a single data link 160.

The transceivers 114 of the base station 100 have a connection to an antenna unit 112 which is used for providing a bi-directional radio connection 170 to a mobile station 150. The structure of the frames transmitted in the bi-directional radio connection 170 is also determined in detail and the connection is referred to as an air interface.

Figure 2:
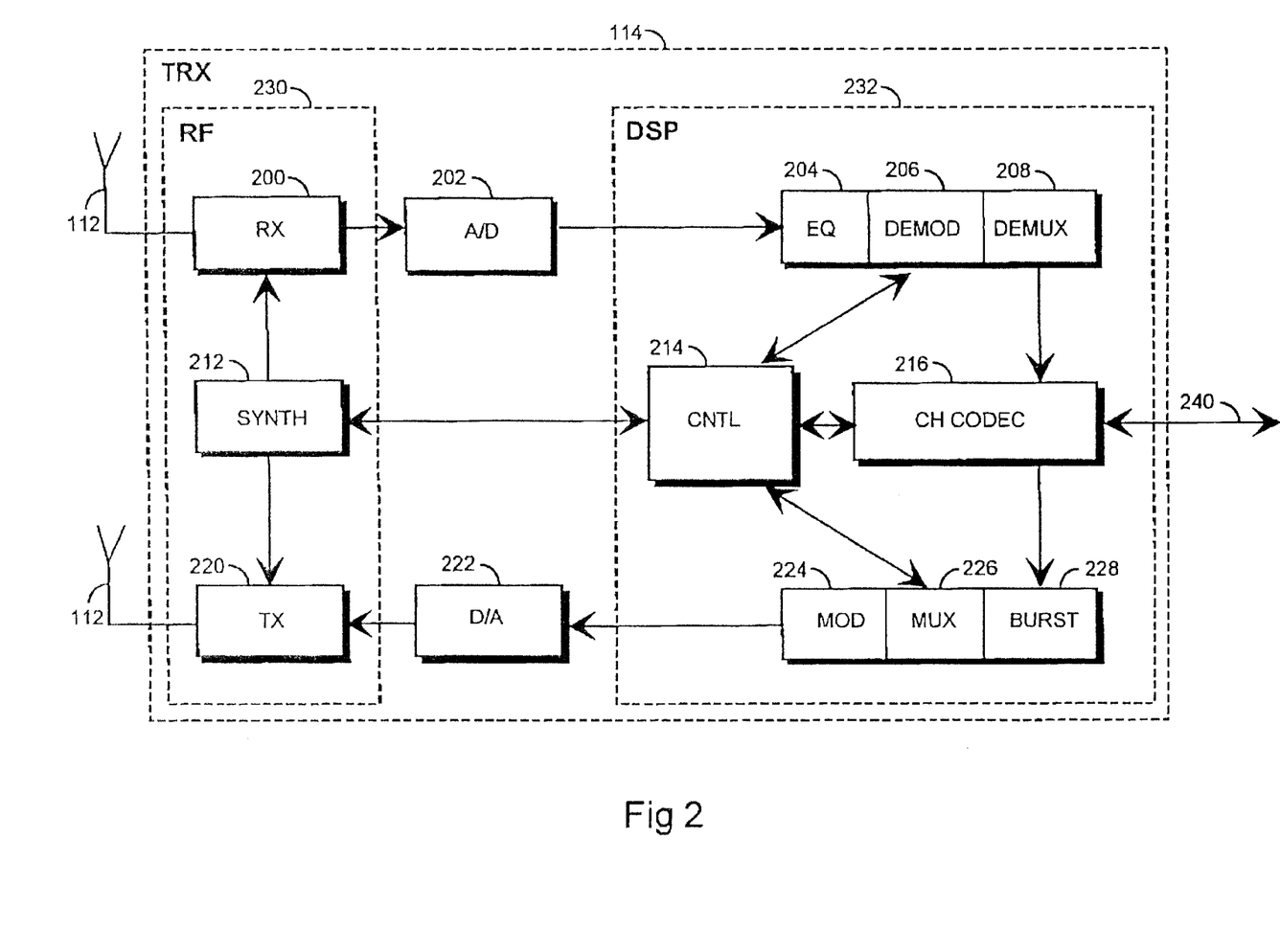
FIG. 2 illustrates a transceiver structure.

FIG. 2 illustrates in greater detail the structure of a transceiver 114. A receiver 200 comprises a filter blocking frequencies outside a desired frequency band. A signal is then converted to an intermediate frequency or directly to baseband, and in this form the signal is sampled and quantized in an analog-to-digital converter 202. An equalizer 204 compensates for interference caused for instance by multi-path propagation. From the equalized signal, a demodulator 206 takes a bit stream, which is transmitted to a demultiplexer 208. The demultiplexer 208 separates the bit stream from the separate time slots into its logical channels. A channel codec 216 decodes the bit stream of the separate logical channels, i.e. decides whether the bit stream is signalling data, which is transmitted to a control unit 214, or whether the bit stream is speech, which is transmitted 240 to a speech codec 122 of the base station controller 102. The channel codec 216 also performs error correction. The control unit 214 performs internal control functions by controlling different units. A burst former 228 adds a training sequence and a tail to the data arriving from the speech codec 216. A multiplexer 226 assigns a specific time slot to each burst. A modulator 224 modulates digital signals to a radio frequency carrier. This operation has an analog nature, therefore a digital-to-analog converter 222 is needed for performing it. A transmitter 220 comprises a filter restricting the bandwidth. In addition, the transmitter 220 controls the output power of a transmission. A synthesizer 212 arranges the necessary frequencies for the different units. The synthesizer 212 comprises a clock which may be locally controlled or it can be centrally controlled from somewhere else, for instance from the base station controller 102. The synthesizer 212 creates the necessary frequencies by means of a voltage controlled oscillator, for example.

As shown in FIG. 2, the structure of the transceiver can be further divided into radio frequency parts 230 and a digital signal processor including software 232. The radio frequency parts 230 comprise the receiver 200, the transmitter 220 and the synthesizer 212. The digital signal processor including software 232 comprises equalizer 204, demodulator 206, demultiplexer 208, channel codec 216, control unit 214, burst former 228, multiplexer 226 and modulator 224. The analog-to-digital converter 202 is needed for converting an analog radio signal to a digital signal and, correspondingly, the digital-to-analog converter 222 is needed for converting a digital signal to an analog signal.

The base station controller 102 comprises a group switching field 120 and a control unit 124. The group switching field 120 is used for switching speech and data and for connecting signalling circuits. The base station 100 and the base station controller 102 form a Base Station System 126 which additionally comprises a transcoder 122. The transcoder 122 is usually located as close to a mobile switching centre 132 as possible because this allows speech to be transmitted between the transcoder 122 and the base station controller 102 in a cellular radio network form, which saves transmission capacity. In the UTMS the base station controller 102 can be referred to as an RNC (Radio Network Controller).

The transcoder 122 converts different digital speech coding modes used between a public switched telephone network and a cellular radio network, to make them compatible, for instance from the 64 kbit/s fixed network form to another form (such as 13 kbit/s) of the cellular radio network, and vice versa. The control unit 124 carries out call control, mobility management, collection of statistical data and signalling.

The UMTS uses an IWU 190 (Interworking Unit) to make the base station system 126 interwork with a second generation GSM mobile switching centre 132 or a second generation packet transmission network support node 180. The IWU is not needed when the base station system is connected to an UMTS mobile switching centre or to an UMTS support node. As shown in FIG. 1, a circuit-switched connection can be established from the mobile station 150 via the mobile switching centre 132 to a telephone 136 connected to a PSTN (Public Switched Telephone Network) 134. A packet-switched connection, such as GSM phase 2+ packet transmission, i.e. GPRS (General Packet Radio Service), can also be used in a cellular radio network. The connection between a packet network 182 and the IWU 190 is created by a support node 180 (SGSN=Serving GPRS Support Node). The function of the support node 180 is to transfer packets between the base station system and a gateway node (GGSN=Gateway GPRS Support Node) 184 and to keep record of the mobile station's 150 location within its area.

The IWU 190 can be a physically separate device, as in FIG. 1, or it can be integrated as part of the base station controller 102 or the mobile switching centre 132. As FIG.

1 shows, when transcoding of the data to be transferred is not allowed, packet transmission data is not necessarily transferred through the transcoder 122 between the IWU 190 and the group switching field 120.

The gateway node 184 connects the packet network 182 and a public packet network 186. The interface can be provided by an Internet protocol or an X.25 protocol. The gateway node 184 encapsulates the internal structure of the packet network 182, thus masking it from the public packet network 186, so for the public packet network 186 the packet network 182 looks like a sub-network, and the public packet network can address packets to a mobile station 150 located in the sub-network and receive packets from it.

A typical packet network 182 is a private network applying an Internet protocol and conveying signalling and tunnelled user data. The structure of the network 182 can vary according to operator, both as regards its architecture and its protocols below the Internet protocol layer.

The public packet network 186 can be for instance a global Internet network into which a terminal 188, for instance a server, with a connection to the network wants to transmit packets addressed to the mobile station 150.

The mobile switching centre 132 is connected to an OMC (Operations and Maintenance Centre) controlling and monitoring the operation of a radio telephone system. The OMC 132 is usually a fairly efficient computer provided with a specific software. The control can also involve separate parts of the system, because control channels needed for control data transfer can be arranged on data transmission connections established between different parts of the system.

Further, the personnel installing a network and controlling the operations possibly have a portable computer including an EM (Element Manager) 140 at their disposal for the management of separate network elements. The Figure shows an example in which the device 140 is connected to a data transmission port located in the control unit 118 of the base station 100, thus enabling the operation of the base station 100 to be monitored and controlled, for instance by examining and changing the values of parameters regulating the operation of the base station.

The structure of the mobile station 150 can be described utilizing the description of the transceiver 114 in FIG. 2. The structural parts of the mobile station 150 are operationally the same as those of the transceiver 114. The mobile station 150 additionally comprises: a duplex filter between the antenna 112 and the receiver 200 and between the antenna 112 the transmitter 220, interface parts and a speech codec. The speech codec is connected to a channel codec 216 via a bus 240.

Figure 3:
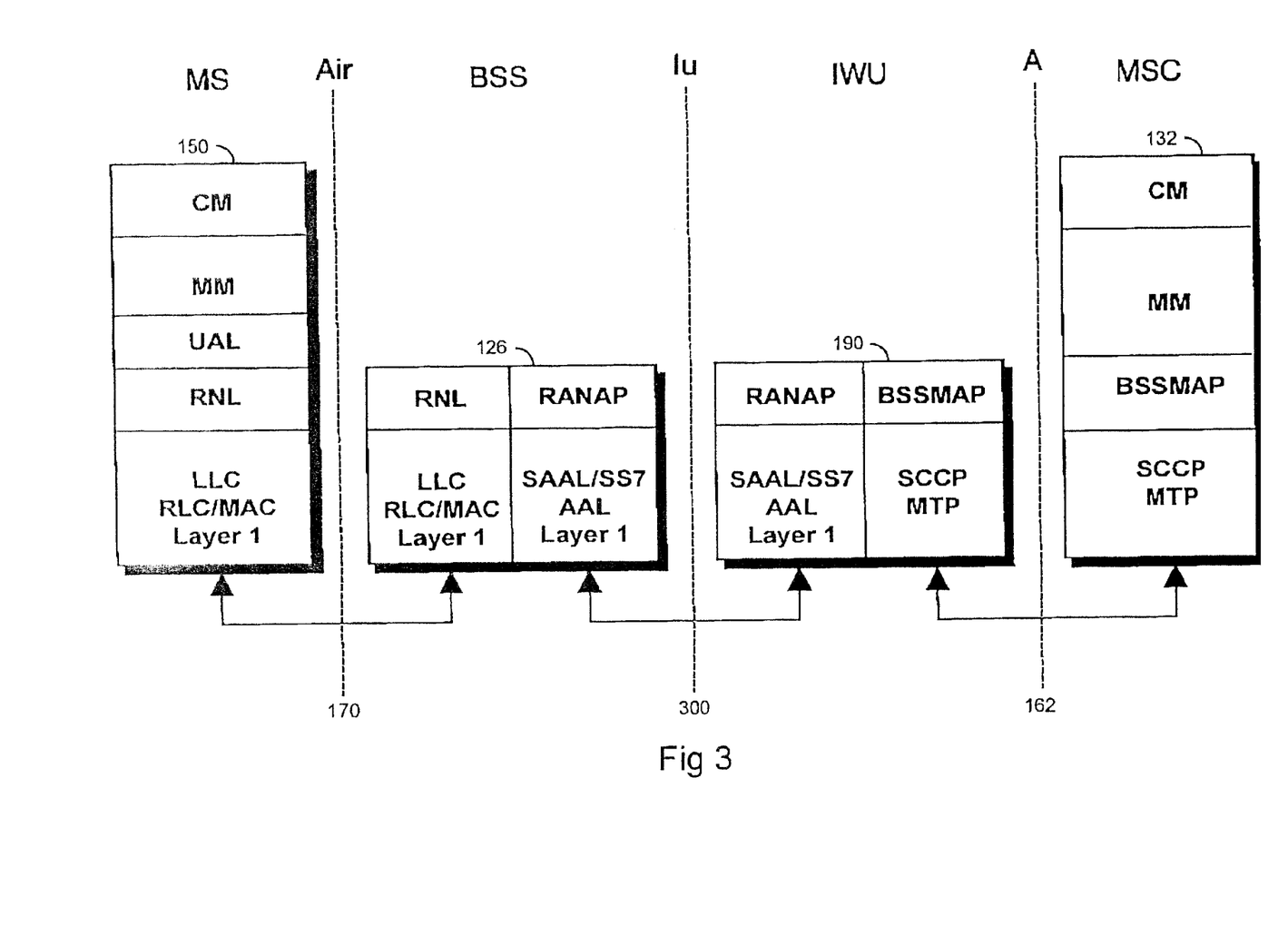
FIG. 3 illustrates cellular radio network protocol stacks.

Since the present invention relates to the processing of protocols used in a cellular radio network, an example illustrating the implementation of the necessary protocol stacks will be described with reference to FIG. 3. The left-most protocol stack in FIG. 3 is a protocol stack located at the mobile station 150. The next protocol stack is in the base station system 126. A third protocol stack is located in the IWU 190. The right-most protocol stack is located in the mobile switching centre 132. The air interface 170 provided by means of the radio connection 170 between the mobile station 150 and the base station system can also be referred to as an Um interface. An interface 162 between the base station system 126 and the mobile switching centre 132 is called an A interface. The interface between the base station system 126 and the IWU is an Iu interface 300.

The protocol stacks are formed according to an OSI (Open Systems Interconnection) model of the ISO (International Standardization Organization). In the OSI model protocol stacks are divided into layers. There can be seven layers. A layer in each device 150, 126, 190, 132 communicates logically with a layer in another device. Only the lowest, physical layers communicate with each other directly. Other layers always use services provided by the layer below. A message must therefore physically travel in a vertical direction between the layers, and only in the lowest layer the message travels horizontally between the layers.

The actual bit level data transmission takes place through the lowest (the first) layer, i.e. a physical layer Layer 1. In the physical layer are determined mechanical, electronic and operational characteristics for connecting to a physical transmission link. The physical layer in the air interface 170 of the GSM is provided by means of TDMA technology. In the UMTS the physical layer is provided by using WCDMA and TD/CDMA. The physical layer provides a second layer with transport services on transport channels. The transport channels are RACH (Random Access Channel), FACH (Forward Access Channel), PCH (Paging Channel), BCH (Broadcast Channel) and DCH (Dedicated Channel). Transport channels determine the method and the parameters for transferring data in the physical layer. Transport channel parameters include: encoding, i.e. outer and inner coding, interleaving, bit rate and mapping to physical channels. In WCDMA the physical channel used by the transport channels is determined by codes. A channelization code, i.e. spreading code, determines the spreading ratio, thus determining also the maximum bit rate to be used. The channelization code is separately determined for uplink and downlink and, depending on the bit rate needed, one or more parallel codes can be simultaneously used. A scrambling code, in turn, separates different mobile stations from one another on uplink and different cells or sectors of cells on downlink.

The next (the second) layer, i.e. a data link layer, uses the services of the physical layer to provide reliable data transmission, which includes correction of transmission errors, for example. The data link provides upper layers with data transmission services on logical channels. The logical channels comprise CCCH (Common Control Channel), PCCH (Paging Control Channel), BCCH (Broadcast Control Channel), DCCH (Dedicated Control Channel) and DTCH (Dedicated Traffic Channel). The logical channels determine the data to be transmitted, unlike transport channels, which determine the method and the parameters to be used for transferring data. The DTCH provides services to upper layers of a user plane, all the other logical channels to upper protocol layers of a control plane.

The data link layer at the air interface 170 is divided into an RLC/MAC sublayer and an LLC sublayer. In the RLC/MAC sublayer, the RLC part is responsible for segmenting and collecting the data to be transmitted. In addition, the RLC part masks quality fluctuations in the radio interface 170 of the physical layer from the upper layers. A sublayer RRC, to be described later, controls the allocation, reconfiguration and releasing of physical code channels, and the transport channels provided by the physical layer. The MAC part carries out the actual allocation/configuration/releasing by command of the RRC sublayer. The MAC part can also indicate to the RRC sublayer that allocation is needed. On the user plane the LLC sublayer controls the data flow at the interface between the second and the third layer. The LLC transfers the received data flow on the radio connection 170 through error detection and correction levels required by the quality of service of the offered service. On the control plane, a radio network sublayer described below communicates directly with the RLC/MAC sublayer.

The third layer, i.e. the network layer, offers to the upper level independence of data transmission and switching techniques taking care of the connection between mobile stations. The network layer carries out connection set-up, maintenance and releasing, for example. A GSM network layer is also known as a signalling layer. It has two main functions: to route messages and to provide for the possibility of a plural number of independent, simultaneous connections between two entities.

The network layer of a common GSM system comprises a connection management sublayer CM, a mobility management sublayer MM and a radio resource management sublayer.

The radio resource management sublayer is responsible for frequency spectrum management and for the reactions of the system to changing radio circumstances. It is further responsible for maintaining a high-quality channel, e.g. by taking care of channel selection, the releasing of a channel, possible frequency hopping sequences, power adjustment, timing, reception of mobile station measurement reports, adjustment of a timing advance, ciphering settings, handover between cells. Messages of this sublayer are transferred between the mobile station 150 and the base station controller 102.

The mobility management sublayer MM handles such consequences caused by the mobility of a mobile station user which do not directly relate to the operation of the radio resource management sublayer. In a fixed network this sublayer would take care of checking user authorities and connecting the user to the network. In cellular radio networks the sublayer in question thus supports user mobility, registration and management of data caused by mobility. The sublayer also checks mobile station identity and the identities of the services allowed. Data transmission concerning the sublayer takes place between the mobile station 150 and the mobile switching centre 132.

The connection management sublayer CM manages all operations associated with circuit-switched call management. The operations involved are provided by a call management entity. In addition, other services, such as SMS (Short Message Service), are provided by separate entities. The connection management sublayer does not detect user mobility. The GSM connection management sublayer operations are therefore almost directly inherited from the ISDN (Integrated Services Digital Network) of the fixed network. The call management entity sets up, maintains and releases calls. It has specific procedures which it applies to calls originated by and terminating to the mobile station 150. Also in this sublayer messages are transferred between the mobile station 150 and the mobile switching centre 132.

The TDMA technique employed in an ordinary physical GSM layer is replaced in the UMTS by a broadband CDMA technique (Code Division Multiple Access) when different frequency bands are used for uplink and for downlink and by a broadband combination of CDMA and TDMA techniques when one and the same frequency band based on a time division duplex method is used for both uplink and downlink. In this case the GSM radio resources management sublayer can not be re-used in the UMTS, but it is replaced by a radio network sublayer RNL providing corresponding services upward. The radio network sublayer can be divided into RBC (Radio Bearer Control) and RRC (Radio Resource Control) sublayers, but it can also be kept as a single entity. When kept as a single entity, it can also be called an RRC sublayer. If the division into sublayers is applied, then the RRC sublayer performs e.g. broadcasting and paging of cell data, processing of mobile station 150 measurement results, and handovers. The RBC sublayer provides the logic connection establishment, thereby determining e.g. radio bearer bit rate, bit/error ratio and whether the transmission concerned is packet-switched or circuit-switched.

When upper protocol layers of second generation systems are used as such, the mobile station 150 needs a UAL (UMTS Adaptation Layer) sublayer between the mobility management and radio network sublayers, the UAL sublayer changing the primitives of a upper mobility management sublayer to primitives of a lower radio network sublayer. The UAL layer enables a plural number of separate mobility management sublayers (such as GPRS and GSM mobility management sublayers) to be arranged into one and the same radio network sublayer.

The only network sublayers processed in the base station system 126 are the radio network sublayer; messages of the connection management and mobility management sublayers are transparently processed, in other words, they are simply transferred back and forth through specific sublayers. A RANAP sublayer (Radio Access Network Application Part) provides procedures for negotiating and managing both circuit-switched and packet-switched connections. It corresponds to BSSAP (Base Station System Application Part) in the GSM, BSSAP comprising BSSMAP (Base Station System Management Part) and DTAP (Direct Transfer Application Part).

Lower layers of the Iu interface 300 can be implemented for instance by means of ATM (Asynchronous Transfer Mode) protocols: SAAL/SS7 (Signalling ATM Adaptation Layer/Signalling System Number 7), AAL (ATM Adaptation Layer).

The IWU 190 comprises RANAP, SAAL/SS7, AAL sublayers and physical layers corresponding to those of the base station system 126.

The IWU 190 and the mobile switching centre 132 further comprise a BSSMAP sublayer through which data associated with a particular mobile station 150 and control data associated with the base station system 126 are transferred between the IWU 190 and the mobile switching centre 132.

In the A interface the first and the second sublayer are implemented by means of MTP and SCCP sublayers (Message Transfer Part, Signalling Connection Control Part). Their structure is simpler than in the air interface 170, because mobility management, for example, is not needed.

As we have now described, with reference to FIGS. 1, 2 and 3, an example of a system and system protocols where the invention can be used, we can proceed to describe the actual method of the invention. The above protocol description showed that the operation according to the invention takes place in the radio network sublayer RNL in particular, and specifically in its RBC sublayer, if the sublayer division in question is applied.

Figure 5:
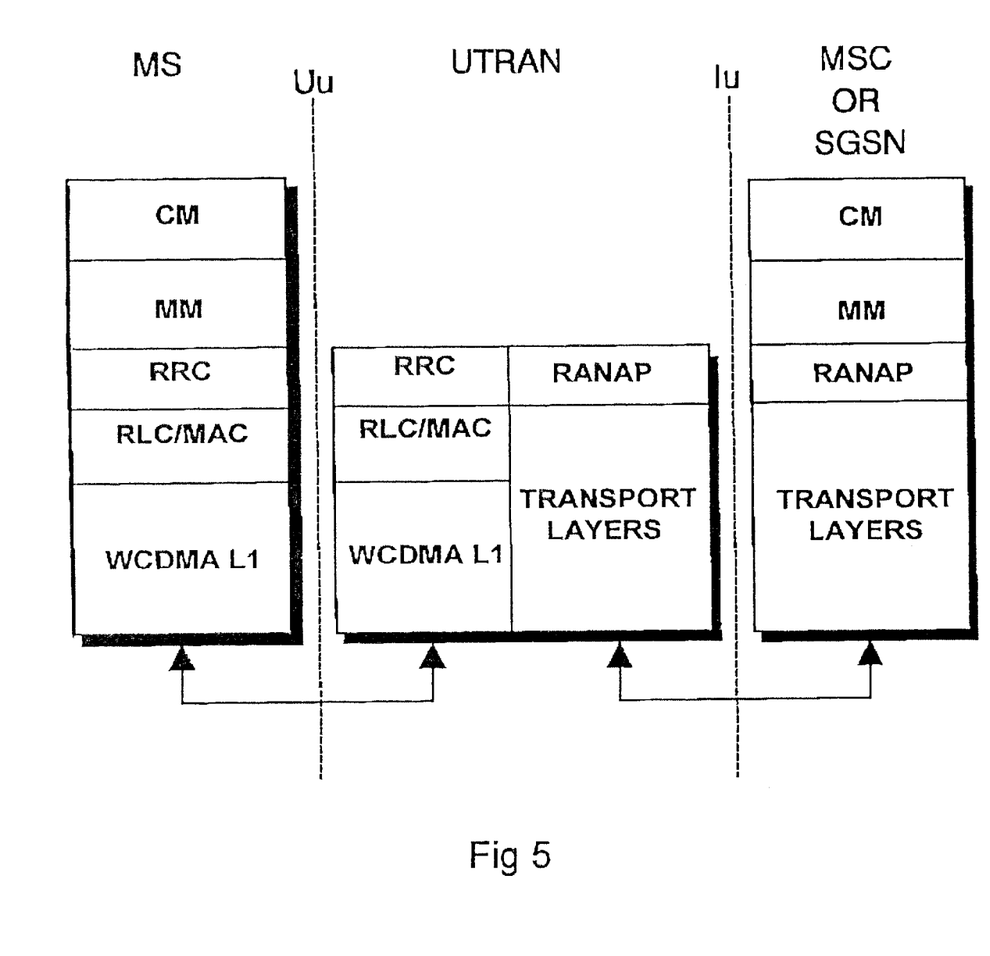
FIG. 5 illustrates protocol stacks of an embodiment.

If the division into sublayers is not applied, then there is no RBC sublayer and therefore the radio network sublayer RNL can be termed an RRC sublayer, according to its only sublayer; protocol stacks of a preferred embodiment based on this are illustrated in FIG. 5. Since the invention mainly concerns the control plane, FIG. 5 only shows control plane protocol stacks. The main parts of a mobile phone system are a core network, a UMTS terrestrial radio access network UTRAN and a mobile station MS. The mobile station can also be referred to as a UE (User Equipment). The interface between the core network and UTRAN is called Iu and the air interface between UTRAN and a mobile station is called Uu.

UTRAN comprises radio network subsystems. A radio network subsystem comprises a radio network controller and one or more so-called B nodes, i.e. base stations, so it is approximately similar to a GSM base station system.

The core network comprises a mobile phone system infrastructure outside UTRAN, such as a mobile switching centre.

FIG. 5 illustrates protocol stacks used by the mobile station MS, the radio access network UTRAN and the mobile switching centre MSC. Unlike in FIG. 3, the IWU is not shown because it is assumed that the mobile switching centre MSC employed is designed for the UMTS. The physical layer in the air interface Uu is implemented by means of a broadband CDMA technique WCDMA L1. The RLC and MAC sublayers follow next. The LLC sublayer is not used on the control plane, the RRC sublayer being directly connected to the RLC/MAC sublayer. Lower transport layers TRANSPORT LAYERS of the Iu interface are not illustrated in such detail as in FIG. 3, because they can be implemented in various ways. Otherwise the description of FIG. 3 also applies, to the extent appropriate, to FIG. 5.

Figure 4A:
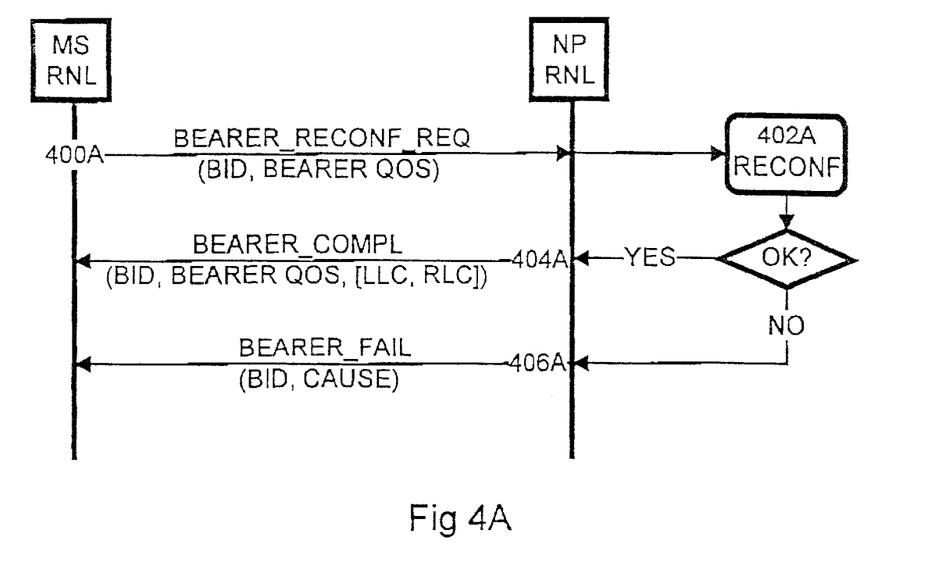
FIG. 4A is a message sequence diagram illustrating a reconfiguration procedure of the invention initiated by a mobile station.

FIG. 4A is a message sequence diagram illustrating how the mobile station radio network sublayer MS RNL communicates with the network part radio network sublayer NP RNL when performing radio bearer reconfiguration. FIG. 4A does not show all details of the communication, i.e. how messages travel in lower data link layers and physical layers. The communication illustrated is known as a peer-to-peer communication. The reconfiguration request message is a radio network sublayer message.

Radio bearer reconfiguration can be initiated by 1. an upper layer, after service parameters are negotiated on a call control plane;

2. the RRC sublayer, by applying algorithms guiding the use of radio resources;

3. even a lower level, such as a MAC sublayer, because of its traffic volume monitoring, or a physical layer, after it has reached the maximum transmission power limit.

The reason for reconfiguration may be an overload situation or degradation of the radio bearer quality, for example. Radio bearer reconfiguration can be requested both by the sender and the receiver: the sender when needing for instance additional capacity, and the receiver when detecting that the quality is too low.

In FIG. 4A the mobile station radio network sublayer MS RNL sends 400A a reconfiguration request message BEARER_RECONF_REQ to the network part radio network sublayer. The message comprises a radio Bearer Identifier BID and Quality of Service BEARER QOS of the bearer in question. The message may comprise more than one BID/BEARER QOS pair, i.e. one message can be used for requesting the reconfiguration of a plural number of separate radio bearers.

The requested reconfiguration 402A is carried out in the network part. If the reconfiguration is successful, the network part sends 404A a reply message BEARER_COMPL informing that the reconfiguration succeeded. The reply message comprises the radio bearer identifier BID and the quality of service BEARER QOS provided. Depending on the implementation, parameters of the LLC sublayer and/or the RLC sublayer can also be transferred. Another option is that the mobile station decodes from the quality of service parameter BEARER QOS the LLC sublayer and/or RLC sublayer parameters concerned, in which case they need not be transferred in the reply message BEARER_COMPL.

If the reconfiguration fails, the network part sends 406A a reply message BEARER_FAIL informing that the reconfiguration failed. In this case the reply message comprises the radio bearer identifier BID and a cause CAUSE for the failure of the reconfiguration.

If the radio network sublayer MS RNL requested in the reconfiguration request message BEARER_RECONF_REQ the reconfiguration of several radio bearers and in case all the reconfigurations succeed, the reply message BEARER_COMPL is sent, all the above described parts being repeated in the message for each radio bearer. Likewise, in case all the reconfigurations fail, the above described reply message BEARER_FAIL is sent, the above described parts, i.e. the radio bearer identifier BID and the cause CAUSE for the failure of its reconfiguration, being repeated in the message for each radio bearer. In case some of the reconfigurations succeed and others fail, separate reply messages are sent for the successful reconfigurations and for the failed ones, or only one message combining the structures of the successful reconfiguration reply message BEARER_COMPL and the failed reconfiguration reply message BEARER_FAIL is sent. In this case the structure of the reply message is for instance the following: (BID, BEARER QOS, [LLC, RLC], BID, CAUSE]. Let us assume that three separate radio bearers having identifiers bid1, bid2 and bid3 were to be configured. Let us further assume that the reconfiguration of bid1 was successful whereas the reconfiguration of the others failed. In this case a single reply message comprises the following: bid1, bid1 qos, [bid1 llc, bid1 rlc], bid2, bid2 cause, bid3, bid3 cause.

Having received the reply message the protocol software of the mobile station changes either its transmission or its reception parameters as a result of the successful reconfiguration, or it starts to plan its next procedure as a result of a failed reconfiguration.

Another way to carry out radio bearer reconfiguration initiated by a mobile station is one in which the mobile station signals on a call control plane to the mobile switching centre that parameters of a user service need to be reconfigured. The mobile switching centre transmits the service parameters to the radio network controller where they are changed into radio bearer parameters. The actual reconfiguration is then carried out in the same way as if the network part had initiated it, i.e. as shown in FIG. 4B.

Figure 4B:
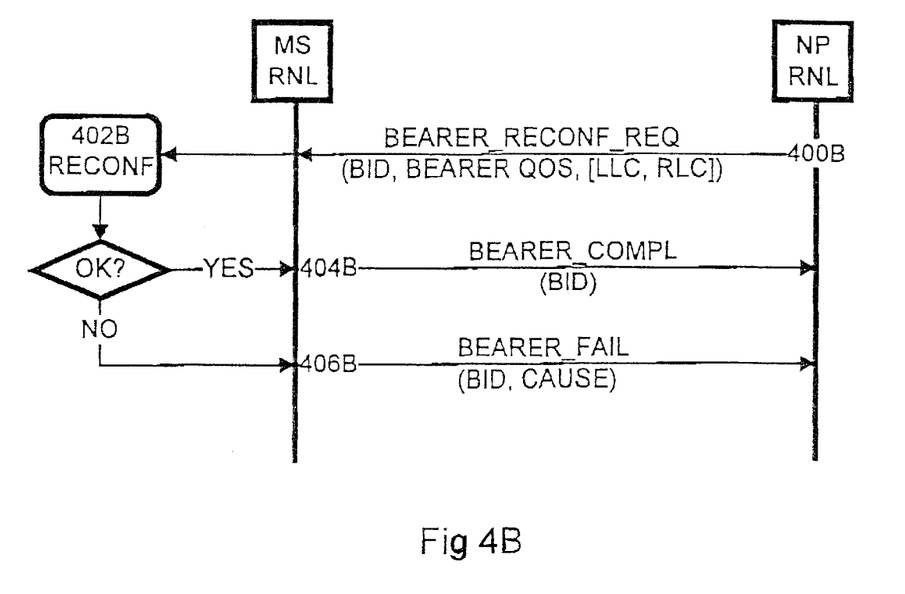
FIG. 4B is a message sequence diagram illustrating a reconfiguration procedure of the invention initiated by a network part.

FIG. 4B illustrates a reconfiguration procedure initiated by the network part. The network part radio network sublayer NP RNL sends 400B a reconfiguration request message BEARER_RECONF_REQ to the peer MS RNL located at the mobile station. Again, the reconfiguration request message BEARER_RECONF_REQ comprises one or more radio bearer identifiers BID and corresponding quality of service BEARER QOS parameters. Since the LLC sublayer and RLC sublayer parameters are decided in the network part, the network part radio network sublayer NP RNL can directly transfer the parameters LLC, RLC in question in the reconfiguration message BEARER_RECONF_REQ. The mobile station radio network sublayer MS RNL initiates the reconfiguration 402B. After a successful reconfiguration the mobile station sends 404B the reply message BEARER_COMPL, the only parameter of which is the radio bearer identifier BID. After a failed reconfiguration the mobile station sends 406B the reply message BEARER_FAIL comprising the radio bearer identifier BID and the cause CAUSE of the failure as parameters. As described in connection with FIG. 4A, a plural number of radio beares can be simultaneously reconfigured and, similarly, the reply message can be a combination of reply messages to a successful and a failed reconfiguration.

In a preferred embodiment, a completed reconfiguration does not require a separate reply message to be sent, instead, the parties observe the success or failure of the reconfiguration by detecting the synchronization of the first layer after the operation has been carried out. Therefore the reply message normally sent after synchronization is left out.

In a preferred embodiment the BEARER_RECONF_REQ parameters comprise at least one of the following parameters:

radio bearer identifier BID;

radio bearer quality of service BEARER QOS of the bearer concerned;

radio bearer cipher parameters, such as cipher mode on/off, optionally a cipher algorithm or key;

RLC/MAC sublayer processing parameters, such as: RLC protocol unit size, temporary mobile station identity or a transport format set, the MAC sublayer selecting from the transport format set one transport format for each physical layer frame of ten milliseconds on the basis of the bit rate needed at a particular moment;

physical layer processing parameters, such as a downlink channelization code, optionally an uplink channelization code;

time of change indicator, i.e. the number of the frame from which on the reconfiguration is to be carried out.

A difference in the principle of the reconfiguration methods illustrated in FIGS. 4A and 4B is that the network part has more power of decision. In a method according to FIG. 4A the network part can change the quality of service requested by the mobile station, whereas a mobile station according to FIG. 4B can only either approve or reject the quality of service determined by the network part. When the mobile station has to reject the reconfiguration requested by the network part, it possibly starts to release the radio bearer or to perform handover.

Reconfiguration can be carried out both for signalling radio bearers and communication radio bearers.

The radio bearer quality of service BEARER QOS can be indicated in various ways. The most typical way is to use at least one parameter indicating the quality of service. The parameter may well guide the operation of the protocols directly, by providing the LLC and the RLC sublayers directly with operational parameters, for example. A parameter can also denote different quality aspects, such as a maximum bit error rate, a maximum transmission delay allowed, a transmission delay deviation, radio bearer priority, radio bearer security, data loss at handover, i.e. whether it is allowed to lose data in connection with handover.

The invention is advantageously implemented by software, the invention thus requiring functions in the protocol processing software located in the control unit 124 of the base station controller 102 and into the protocol processing software located in the transceiver processor 214 of the mobile station 150.

Even though the invention is described above with reference to an example shown in the attached drawings, it is apparent that the invention is not restricted to it, but can vary in many ways within the inventive idea disclosed in the attached claims.

What is claimed is:

1. A method for reconfiguring a cellular radio network connection, said method comprising:

establishing a cellular radio network connection between a mobile station and a network part through at least one radio bearer;

sending, from a first party of the connection to a second party of the connection, a radio bearer reconfiguration request message concerning at least one radio bearer; and sending, from the second party of the connection to the first party of the connection, a reply message to the radio bearer reconfiguration request message, wherein the radio bearer reconfiguration request message comprises at least one radio bearer identifier and bearer quality of service of the radio bearer in question, wherein at least one of the sending steps occurs after the establishing step.

2. A method according to claim 1, wherein the quality of service is indicated by at least one parameter.

3. A method according to claim 2, wherein the parameter is at least one LLC sublayer parameter.

4. A method according to claim 2, wherein the parameter is at least one RLC sublayer parameter.

5. A method according to claim 1, wherein the radio bearer is used for signalling.

6. A method according to claim 1, wherein the radio bearer is used for communication.

7. The method of claim 1, further comprising:

transmitting data in the cellular radio network connection between the mobile station and the network part through the at least one radio bearer, wherein the sending steps occur after the transmitting step.

8. A method for reconfiguring a cellular radio network connection, said method comprising:

establishing a cellular radio network connection between a mobile station and a network part through at least one radio bearer;

sending, from a first party of the connection to a second party of the connection, a radio bearer reconfiguration request message concerning at least one radio bearer; and sending, from the second party of the connection to the first party of the connection, a reply message to the radio bearer reconfiguration request message, wherein the reply message comprises at least one radio bearer identifier and a cause for a failed reconfiguration of the radio bearer in question, wherein at least one of the sending steps occurs after the establishing step, wherein at least one of the sending steps occurs after the establishing step.

9. The method of claim 8, further comprising:

transmitting data in the cellular radio network connection between the mobile station and the network part through the at least one radio bearer, wherein the sending steps occur after the transmitting step.

10. A method for reconfiguring a cellular radio network connection, said method comprising:

establishing a cellular radio network connection between a mobile station and a network part through at least one radio bearer; and sending, from a first party of the connection to a second party of the connection, a radio bearer reconfiguration request message concerning at least one radio bearer, wherein the parties of the connection detect the success of the reconfiguration by monitoring physical layer synchronization and wherein the sending step occurs after the establishing step.

11. A method according to claim 10, wherein the second party of the connection sends to the first party of the connection a reply message to the radio bearer reconfiguration request message.

12. A method according to claim 10, wherein the radio bearer reconfiguration request message comprises at least one radio bearer identifier.

13. A method according to claim 10, wherein the radio bearer reconfiguration request message comprises at least bearer quality of service of the radio bearer in question.

14. A method according to claim 10, wherein the radio bearer reconfiguration request message comprises at least cipher parameters of the radio bearer.

15. A method according to claim 10, wherein the radio bearer reconfiguration request message comprises at least sublayer processing parameters.

16. A method according to claim 10, wherein the radio bearer reconfiguration request message comprises at least physical layer processing parameters.

17. A method according to claim 10, wherein the radio bearer is used for signalling.

18. A method according to claim 10, wherein the radio bearer is used for communication.

19. The method of claim 10, further comprising:
   transmitting data in the cellular radio network connection between the mobile station and the network part through the at least one radio bearer, wherein the sending step occurs after the transmitting step.

20. A method for reconfiguring a pre-established cellular radio network connection comprising a network, the network part having a connection to a mobile station through at least one radio bearer, in which method:
   a first party of the connection sends to a second party of the connection a radio bearer reconfiguration request message concerning at least one radio bearer;
   the second party of the connection sends to the first party of the connection a reply message to the radio bearer reconfiguration request message, wherein the reply message comprises at least one radio bearer identifier and a cause for a failed reconfiguration of the radio bearer in question, and wherein the quality of service (BEARER QOS) is indicated by at least one parameter, and
   wherein the parameter is selected from the group consisting of bit error rate, maximum transmission delay, transmission delay deviation, priority, security and data loss at handover.

21. A method for reconfiguring a pre-established cellular radio network connection comprising a network, the network part having a connection to a mobile station through at least one radio bearer, in which method:
   a first party of the connection sends to a second party of the connection a radio bearer reconfiguration request message concerning at least one radio bearer,
   wherein the parties of the connection detect the success of the reconfiguration by monitoring physical layer synchronization, and wherein the radio bearer reconfiguration request message comprises at least a starting time indicator, the starting time indicator being the number of the frame from which parameters determined by the reconfiguration must be used.

* * * * *